Nov. 9, 1965 R. MARCHAL ETAL 3,216,077
PROCESS FOR MAKING A LEAD SCREEN
Filed Aug. 14, 1962
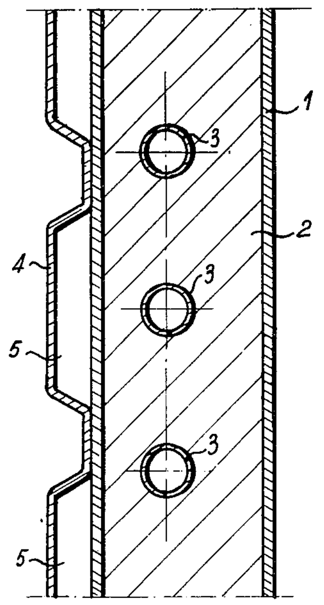

United States Patent Office 3,216,077

Patented Nov. 9, 1965

3,216,077

PROCESS FOR MAKING A LEAD SCREEN

Raymond Marchal, Paris, Roger Chevalier, Suresnes, and Michel Combecave, Vitry, France, assignors to Commissariat a l'Energie Atomique, Paris, France Filed Aug. 14, 1962, Ser. No. 216,903
Claims priority, application France, Sept. 10, 1961, 872,101
3 Claims. (Cl. 22—203)

The present invention relates to a lead screen and its process of manufacture. Such screens are used for limiting the propagation of gamma radiation in the vicinity of the core of a reactor.

The invention relates particularly to the manufacture of lead screens for use around the core of a swimming-pool pile for studying materials under radiation. Such a pile can comprise for example a series of separate mounting members disposed in the vicinity of the core in such a way that the device or the material being tested may be placed against the latter. A lead screen is disposed between the core and the device or material tested, to restrict as much as possible the action of the gamma radiation.

The protection of such screens against corrosion requires them to be encased by means of a light metal, such as aluminium or an aluminium alloy.

On the other hand, under the effect of radiation lead undergoes an elevation in temperature and thus requires to be cooled by passing demineralised water through tubes located in the screen itself or in channels formed by corrugations welded to the screen.

The thermal exchange between the cooling water, the lead and the casing only takes place satisfactorily if there is sufficient adherence between the lead and the casing to ensure good thermal conductivity between the metals.

The present invention has the object of providing a lead screen and its process of manufacture which overcomes the aforesaid disadvantages.

According to the invention, a process is provided for the manufacture of lead screens encased with a light metal or light alloy, in which a metallic covering of small thickness comprising at least one additional layer of metal is provided on the internal surface of the casing to which the lead must adhere, the surface so covered is cleaned by fluxing and then the lead is cast in contact with such covering.

In order that the invention may be readily understood, a preferred embodiment thereof is described below in conjunction with the accompanying drawing, in which the single figure shows a sectional view of a lead screen according to the invention.

The process according to the invention, an example of the product of which is illustrated in the drawing, consists essentially in providing on the inner face of the casing a metallic covering of small thickness and of one or more layers cleaning the inner face of the covering so obtained by fluxing it and then casting in the lead which is to constitute, inside the casing, the screen itself.

The metallic covering provided on the inner face of the casing is obtained electrolytically, chemically or by dipping and can comprise a single layer or several metallic layers of different kinds.

By diffusion between them as well as into the adjacent masses, the metals form intermetallic compounds which provide a satisfactory junction between the metal of the casing and the lead.

In a first embodiment of the process of the invention, two successive layers are provided by electrolytic deposition, one being of copper and the other of tin.

In a second electrolytic embodiment, a layer of copper, a layer of nickel and a layer of tin are successively deposited.

In a third embodiment, a layer of nickel is deposited chemically and then a layer of tin is deposited electrolytically.

In each of the foregoing embodiments, electrolytic plating can be replaced by a dipped type of deposition.

In a final embodiment, the metallic deposit comprises a single nickel layer deposited chemically.

If the lead screen is traversed by cooling tubes, their external walls naturally become subjected to the same treatment.

In the embodiment illustrated in the accompanying drawing, the casing 1 is covered, on its inner surface, with a metallic deposit obtained according to one of the various methods described above and having a thickness which can vary between 5 thousandths and several hundredths of a millimetre. It is filled with lead 2.

A variant of the construction of the screen comprises providing a cooling circuit constituted by tubes 3 of a light metal or alloy themselves covered on their external surfaces by a metallic deposit.

In another embodiment, the casing 1 comprises a corrugation 4 with circulation of cooling water in the resultant channels 5.

The process according to the invention allows good adhesion to be obtained between the lead and the aluminium or aluminium alloy or other casing metal, but certain precautions are desirably taken while pouring or casting in the lead.

If in producing a lead screen, which may or may not include cooling tubes of aluminium or aluminium alloy, the lead is merely poured inside the casing and between the tubes, the surfaces in contact with the lead having previously been covered with a suitable deposit, contraction of the mass of lead then takes place in the course of cooling and, because of the small thickness of the covering and the large temperature gradient between its two surfaces, there is a risk of deformation of the screen and separation between the lead and the internal faces of the casing and the periphery of the tubes, if the adhesion is not substantially perfect.

The use of a casting method known as the "immersion" method allows these possible disadvantages to be avoided.

In this method, after covering the internal surfaces of the casing and the periphery of the cooling tubes with a suitable deposit, the lead is poured into a mould in which the casing and the tubes have previously been positioned. The lead fills all the available space, including that on the outside of the casing.

After cooling, a compact block is obtained, which has a thickness of about three times that of the lead screen itself and which completely surrounds it. The lead is then removed from the two ends of the screen and the sheets of lead situated on either side of the screen readily separate, as the lack of a preliminary deposit on the exterior walls of the casing does not allow the lead to adhere.

We claim:

1. A process for the manufacture of a lead screen in a light metal casing comprising the steps of applying at least one additional layer of metal to which lead adheres on the internal surface of the casing, then cleaning the coated internal surface by fluxing, then placing the casing in a mold, then casting lead both inside and outside of the casing in the mold and in contact with the coated internal surface of the casing and then removing excess lead from the outside of the casing.

2. A process as described in claim 1 including the step of providing cooling tubes within the thickness of the lead screen.

3. A process as described in claim 2 including the steps of assembling the cooling tubes within the casing and then subjecting the external surfaces of the cooling tubes to the same treatment as the internal surface of the casing prior to casting the lead.

References Cited by the Examiner

UNITED STATES PATENTS

| | | | |
|---|---|---|---|
| 242,624 | 6/81 | Frishmuth | 22—203 X |
| 2,116,896 | 5/38 | Hudson | 22—203 |
| 2,268,566 | 1/42 | Chace | 22—203 XR |
| 2,540,006 | 1/51 | Otto | 22—203 XR |
| 3,005,105 | 10/61 | Lusk. | |
| 3,020,222 | 2/62 | Zambrow et al. | |
| 3,020,610 | 2/62 | Rejdak | 22—203 |
| 3,028,326 | 4/62 | Brand et al. | |

J. SPENCER OVERHOLSER, *Primary Examiner.*

MARCUS U. LYONS, *Examiner.*